US011785333B2

United States Patent
Nayak et al.

(10) Patent No.: US 11,785,333 B2
(45) Date of Patent: Oct. 10, 2023

(54) SIMULATION-BASED CAPTURE SYSTEM ADJUSTMENTS

(71) Applicant: HEWLETT-PACKARD DEVELOPMENT COMPANY, L.P., Spring, TX (US)

(72) Inventors: Vijaykumar Nayak, San Diego, CA (US); Nathan Reede Mazhar Godwin, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/272,592

(22) PCT Filed: Jan. 8, 2019

(86) PCT No.: PCT/US2019/012650
§ 371 (c)(1),
(2) Date: Mar. 1, 2021

(87) PCT Pub. No.: WO2020/145945
PCT Pub. Date: Jul. 16, 2020

(65) Prior Publication Data
US 2021/0360148 A1 Nov. 18, 2021

(51) Int. Cl.
*H04N 5/232* (2006.01)
*H04N 23/60* (2023.01)
(Continued)

(52) U.S. Cl.
CPC ........... *H04N 23/64* (2023.01); *H04N 17/002* (2013.01); *H04N 23/90* (2023.01); *H04N 13/243* (2018.05); *H04N 13/246* (2018.05)

(58) Field of Classification Search
CPC .. H04N 5/23222; H04N 5/247; H04N 17/002; H04N 13/246; H04N 13/243
(Continued)

(56) References Cited

U.S. PATENT DOCUMENTS 7,821,513 B2 * 10/2010 Bae ......................... G06F 30/00
382/128
8,130,244 B2 * 3/2012 Cooper ................... G06T 15/60
345/619
(Continued)

FOREIGN PATENT DOCUMENTS

WO WO-2001084479 A1 11/2001

OTHER PUBLICATIONS

Paul Merrell et al, "Real-Time Visibility-Based Fusion of Depth Maps", 2007, University of North Carolina.
(Continued)

*Primary Examiner* — Trang U Tran
(74) *Attorney, Agent, or Firm* — Michael Dryja

(57) ABSTRACT

In one example in accordance with the present disclosure, a system is described. The system includes a replicator to receive a reference model of an object to be scanned. A capture system simulator of the system simulates capture settings. The capture system includes a number of capture devices placed around the object. The capture system also includes a controller. The controller extracts simulated capture data for the capture system and determines adjustments to the capture settings based on extracted simulated capture data.

17 Claims, 14 Drawing Sheets

(51) Int. Cl.
    *H04N 17/00*         (2006.01)
    *H04N 23/90*         (2023.01)
    *H04N 13/246*       (2018.01)
    *H04N 13/243*       (2018.01)

(58) Field of Classification Search
    USPC ........................................................ 348/187
    See application file for complete search history.

(56) References Cited

U.S. PATENT DOCUMENTS

| | | | |
|---|---|---|---|
| 8,837,026 B2 | 9/2014 | Fisker | |
| 9,270,976 B2 * | 2/2016 | Houvener | G03B 35/20 |
| 9,325,974 B2 | 4/2016 | Herbert | |
| 10,778,908 B2 * | 9/2020 | Chang | H04N 5/3572 |
| 11,227,410 B2 * | 1/2022 | Hofer | G06T 7/80 |
| 2002/0057438 A1 | 5/2002 | Decker | |
| 2008/0036755 A1 | 2/2008 | Bae | |
| 2016/0071318 A1 | 3/2016 | Lee | |
| 2017/0223342 A1 | 8/2017 | Tan | |
| 2017/0272728 A1 | 9/2017 | Rafii | |
| 2018/0249088 A1 | 8/2018 | Chang | |
| 2018/0293746 A1 | 10/2018 | Rosman | |

OTHER PUBLICATIONS

Thibaut Weise et al, "Online Loop Closure for Real-Time Interactive 3D Scanning", 2010, Switzerland.

\* cited by examiner

US 11,785,333 B2

SIMULATION-BASED CAPTURE SYSTEM ADJUSTMENTS

BACKGROUND

Capture systems are used to generate three-dimensional (3D) virtual representations of objects. For example, multiple cameras may be placed around an object such as a trophy. Data from the cameras is collected and used by a computing device to generate a 3D model of the object.

BRIEF DESCRIPTION OF THE DRAWINGS e accompanying drawings illustrate various examples of the principles described herein and are part of the specification. The illustrated examples are given merely for illustration, and do not limit the scope of the claims.

Figure 1:
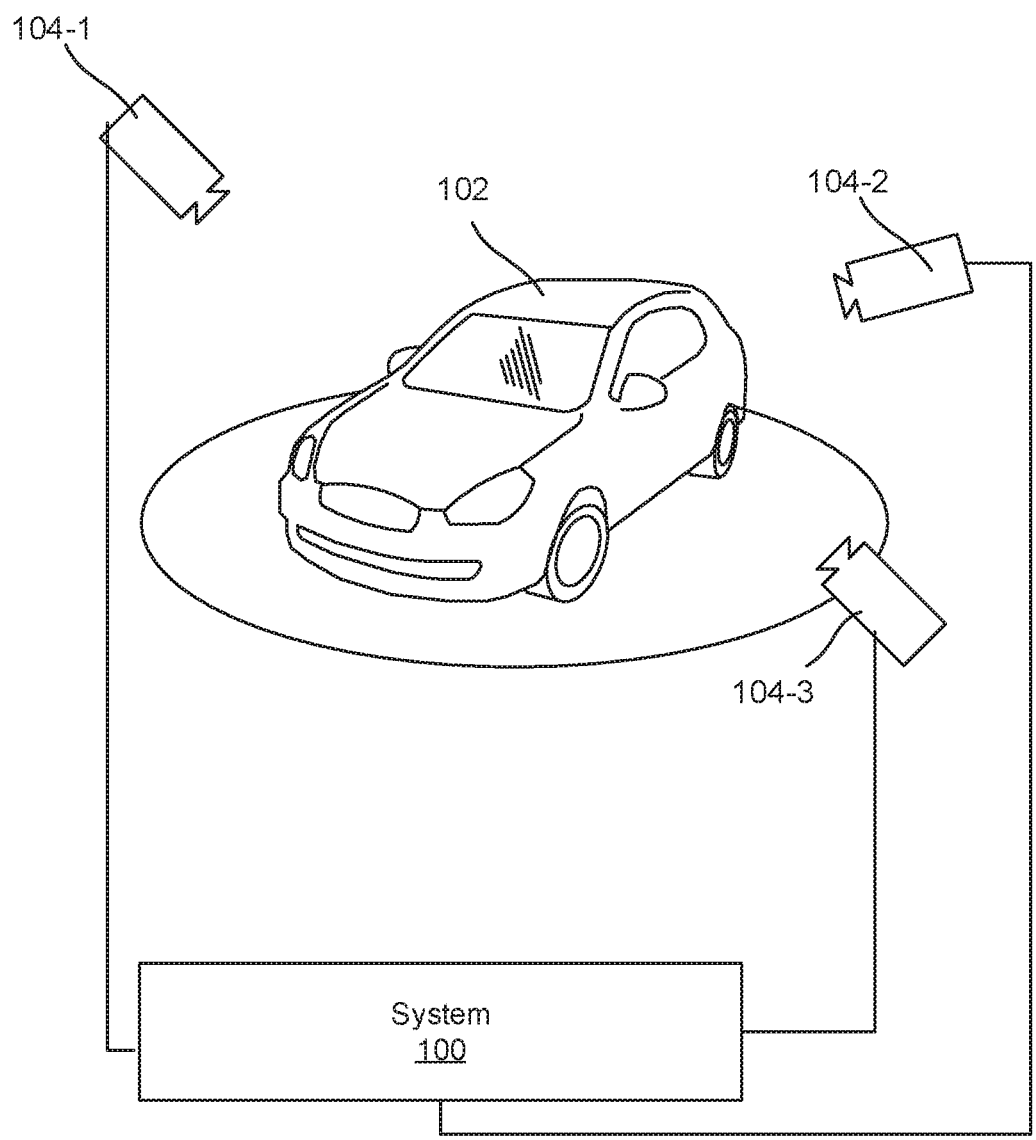
FIG. 1 is a diagram of the environment for simulation-based capture system adjustments, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Three-dimensional (3D) scanning is an operation that has application in a variety of industries. For example, 3D objects may be used in 3D printing, where a user implements any number of operations to re-create a physical object. In this example, a user may place the object on a stage. A camera, or cameras, are then used to capture information from which an electronic 3D model can be generated. While one particular example is provided, there are any number of scenarios in which a physical object is scanned by capture devices and digitized.

While such capture systems undoubtedly open doors for a variety of uses, some enhancements to the operation of these systems may improve their practical use. For example, the effectiveness of the capture system relies on the position and capturing characteristics of the capture devices that make up the system. For example, in order to properly capture a 3D model of a physical object, all surfaces of the 3D object should be within the field of view of at least one capture device of the capture system. To ensure this, the capture devices positions are adjusted many times in order to get a set-up where all surfaces of the 3D object are viewed.

The placement and adjustment of the capture devices in a system may be complex, time-consuming, and burdensome. Moreover, it may not be possible to determine if capture device placement is satisfactory until after the capture process is complete. Accordingly, a user may have to iteratively perform a 3D scan (which may be a long process), determine if there are occlusions, or portions of the 3D object that were not captured, and then manually re-position the capture devices in an attempt to broaden the coverage. This process may be repeated multiple times, per 3D capture. As one can imagine, such a process of adjusting the cameras, performing a full 3D scan, and re-adjusting the cameras based on the output may be computationally expensive for the computing device and may prohibitively time consuming to a user.

Accordingly, the present specification describes a method and system that provides an automated solution by simulating the field of view of the different capture devices and then, prior to performing a 3D scan, adjusting the capture devices to ensure that the object is scanned with a satisfactory degree of coverage and/or quality level.

Specifically, the present specification describes a system. The system includes a replicator to receive a reference model of an object to be scanned. A capture system simulator of the system simulates capture settings. The capture system in this example includes a number of capture devices placed around the object. The system also includes a controller. The controller 1) extracts simulated capture data for the capture system and 2) determines adjustments to the capture settings based on extracted simulated capture data.

The present specification also describes a method. According to the method, a reference model of an object to be scanned is received. Capture settings of a capture system are simulated, which capture system includes a number of capture devices placed around the object. Simulated capture data for the capture system is extracted and adjustments to the capture settings are determined based on extracted simulated capture data.

The present specification also describes a non-transitory machine-readable storage medium encoded with instructions executable by a processor. The machine-readable storage medium includes instructions to receive a reference model of an object to be scanned and instructions to simulate capture settings of a capture system, which system includes a number of capture devices placed around the object. The machine-readable storage medium also includes instructions to extract simulated capture data for the capture system and to fuse extracted capture data for each capture device in the capture system. The machine-readable storage medium also includes instructions generate a visualization of the capture system and the reference model and to compare fused data against the reference model. The machine-readable storage medium also includes instructions to determine a quality metric for the capture system capture and to compare the quality metric against a quality threshold. The machine-readable storage medium also includes instructions to determine adjustments to the capture settings based on an output of a comparison of the quality metric against the quality threshold and to adjust the capture settings.

In summary, using such a system 1) automates the capture system adjustment operation, 2) allows for capture system adjustment prior to a full 3D scan, 3) conserves processing bandwidth, 4) enhances three-dimension scanning process flow, 5) improves scan quality, 6) speeds up new product design configuration and 7) allows for adjustment to compensate for different types and dimensions of objects to be scanned. However, the devices disclosed herein may address other matters and deficiencies in a number of technical areas.

As used in the present specification and in the appended claims, the term "reference model" refers to either a virtual or physical stand-in object for the object to be scanned. That is, the reference model is a generic representation of the object, which reference model is used as a placeholder during capture system setting adjustment. As will be described below, in some examples the reference model may have a form and shape similar to the object to be scanned.

Turning now to the figures, FIG. 1 is a diagram of the environment for simulation-based capture system adjustments, according to an example of the principles described herein. As described above, the capture system includes a number of capture devices (104-1, 104-2, 104-3) such as cameras that are used to collect data from an object (102) such that a digital 3D model of the object (102) may be generated. The capture devices (104) may be of any type such as cameras, scanners, or other forms of capture device (104). The capture devices (104) may be placed around the object (102), which in the example depicted in FIG. 1 is a toy car.

The output of the capture devices (104-1, 104-2, 104-3) is passed to the system (100) which allows for the generation of the 3D model of the object. However, prior to such a capture, the capture devices (104-1, 104-2, 104-3) may be simulated. That is, information related to the device characteristics as well as the location of the capture devices (104) may be sent to the system (100). The combination of the capture device location information and capture device settings may be referred to as the capture system settings.

The system (100) then recreates the environment such that the capture device (104) position, location and/or settings may be adjusted to ensure that a high-quality scan of the object is output. Note that while FIG. 1 depicts three capture devices (104), any number of capture devices may be implemented in accordance with the principles described herein.

The capture system may include any number of capture devices (104) which may be stationary or mobile. For example, the capture system may include multiple stationary cameras placed around a stage where an object (102) to be scanned is placed. During capture, each stationary capture device (104) collects data for the object (102). In another example, a single moving camera is placed about the stage. During capture, the camera moves about the object (102) to collect the data.

Figure 2:
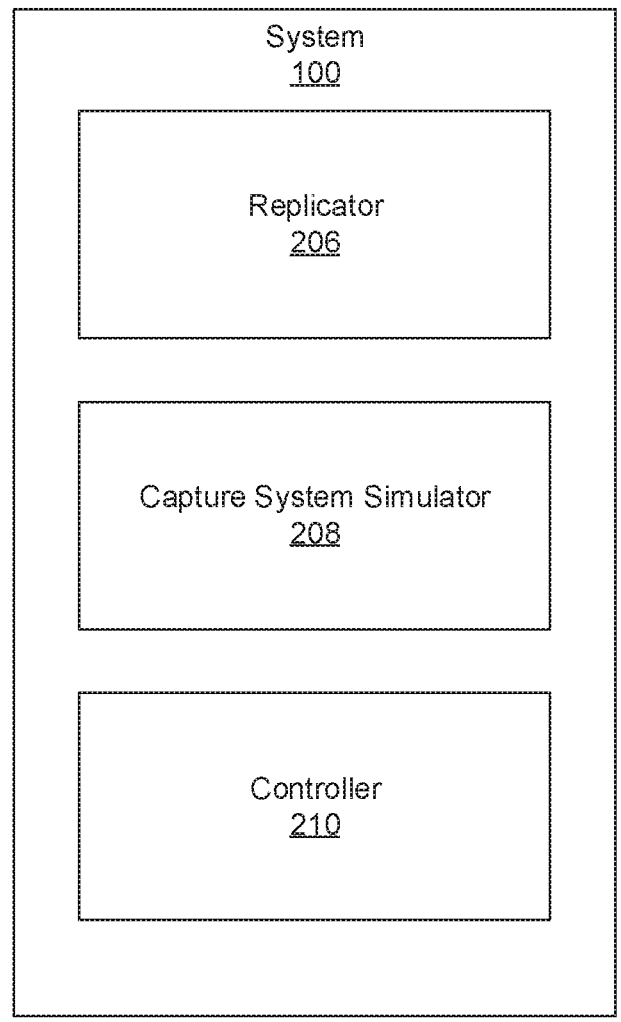
FIG. 2 is a block diagram of a system for simulation-based capture system adjustments, according to an example of the principles described herein.

FIG. 2 is a block diagram of the system (100) for simulation-based capture system adjustments, according to an example of the principles described herein. As described above, the system (100) collects information from any number of capture devices (FIG. 1, 104) and generates a 3D model of an object (FIG. 1, 102) to be scanned.

However, prior to such a 3D scan, the system (100) also generates a simulation of the capture environment. Accordingly, the system (100) includes a replicator (206) to receive a reference model of an object (FIG. 1, 102) to be scanned. The reference model is a reference, or stand-in 3D model of the object (FIG. 1, 102) to be scanned. In some examples, the reference model may be a virtual approximation of the object (FIG. 1, 102) to be scanned. That is, the reference model may have a similar shape and form as the object (FIG. 1, 102) to be scanned. The reference model may be represented as a cloud of points, each point having a unique location coordinate. That is, the object (FIG. 1, 102) to be scanned may be represented as a cloud of points, each having an x, y, and z coordinate. Other coordinate systems such as a polar coordinate system may be used as well. While particular reference is made to a point cloud, the reference model may be referenced in other ways, such as a mesh layout, or a topographical map of the surface.

The point cloud reference model may be a standard against which point clouds from the individual capture devices (FIG. 1, 104) of the capture system can be compared. For example, if the object (FIG. 1, 102) to be scanned is a shoe, a reference model shoe may be received, which reference model shoe includes a standard number and dispersion of points across its visible surface. A simulation of the capture system capture is then compared against the reference model to determine what, if any, changes should be made to the capture system to enhance the quality of the scan.

In some examples, the reference model may be a physical model. In this example, the point clouds are extracted from actual cameras positioned around the reference model, and not extracted from simulated capture devices positioned about a virtual reference model.

The system (100) also includes a capture system simulator (208) that simulates capture settings. In the present specification and in the appended claims, the term capture system refers to a number of capture devices placed around an object (FIG. 1, 102) and the capture settings refer to the operating conditions of the system. The operating conditions include, but are not limited to capture device placement and/or capture device characteristics. That is, the capture system simulator (208) simulates the particular characteristics of the capture devices (FIG. 1, 104) in the capture system. That is, the capture system as a whole may have certain settings such as a number of capture devices (FIG. 1, 104) in the capture system, the placement of those capture devices (FIG. 1, 104) both relative to the object (FIG. 1, 102) to be scanned and relative to other capture devices (FIG. 1, 104), as well as incidence angle of each capture device (FIG. 1, 104) to the object (FIG. 1, 102).

Each capture device (FIG. 1, 104) may also have certain characteristics. Examples of capture device characteristics include field of view, quality setting, sensitivity, focal length, etc. The capture system simulator (208) simulates these characteristics. While particular reference is made to a few types of system characteristics and device characteristics, the capture system simulator (208) may capture other characteristics as well.

The capture system and capture device (FIG. 1, 104) characteristics affect how, or rather what portions of, the object (FIG. 1, 102) are captured. For example, the location of the capture devices (FIG. 1, 104) within the system relative to each other affect the amount of the object (FIG. 1, 102) that can be seen. Moreover, the distance between the object (FIG. 1, 102) and the capture device(s) (FIG. 1, 104)

affects how much of the object (FIG. 1, 102) is within the field of view of the capture device (FIG. 1, 104).

Device characteristics also affect the ability of each capture device (FIG. 1, 104) within the capture system to generate a complete image of the object (FIG. 1, 102). For example, a camera's focal distance may affect how much is captured. Also, the ISO, resolution, or other imaging characteristics of each capture device (FIG. 1, 104) may affect the quality and/or resolution of the image that is captured. As another example, the point clouds acquired may be noisy and be affected by an incidence angle, field of view, camera distortions, etc. Accordingly, the capture system simulator (208) applies actual camera operating conditions such as noise, and the above-mentioned camera settings such that the environmental conditions are modeled in the virtualization.

Accordingly, the capture system simulator (208) simulates the capture characteristics of each capture device (FIG. 1, 104) as well as of the capture system as a whole. In other words, the capture system simulator (208) recreates, during a preparation stage, the capture environment and thereby can be used to determine an expected 3D scan given the current set-up.

The controller (210) of the system (100) then extracts simulated capture data for the capture system. That is, the controller (210) simulates an image capture from the capture device. This may include extracting a portion of the point cloud of the reference model that is visible to each capture device (FIG. 1, 104). That is, the point cloud of the reference model may define an entire surface of the reference model. The controller (210) extracts, from each capture device (FIG. 1, 104) that portion of the reference model point cloud within the field of view of that capture device (FIG. 1, 104). That is, a camera may only see a portion of the point cloud points that represent the reference model. The points visible to a particular capture device (FIG. 1, 104) may be identified through any number of operations including raytracing. In other words, the extracted points are just those that are visible through a lens of a particular capture device (FIG. 1, 104).

Determining what each capture device (FIG. 1, 104) can see allows the system (100) to replicate a point cloud acquisition from an actual capture device (FIG. 1, 104) at that point. This extracted information is useful in determining a quality of the capture of the capture system and to adjust and optimize the individual capture devices (FIG. 1, 104) of the capture system.

Accordingly, the controller (210) can determine adjustments to the capture settings based on the extracted simulated capture data. That is, in general the controller (210) may output adjustments to the characteristics of the capture system to ensure that a high-quality scan of the physical object (FIG. 1, 102) is generated when the scanning operation is initiated.

Either or both of the capture environment and individual capture device characteristics may be adjusted. For example, the quantity and/or position of capture devices (FIG. 1, 104) may be adjusted. Also, the capture characteristics such as ISO, focal length, field of view, sensitivity, etc. of the individual capture devices (FIG. 1, 104) may be adjusted. Note that simulation and determination of adjustments may be made before the scan is carried out. That is, the scanning operation itself is a heavy load on a computing device, whereas the simulation of a capture environment is less computationally expensive. Accordingly, the present scanning system (100) makes the scanning process more efficient by adjusting/optimizing capture device (FIG. 1, 104) placement and settings during a simulation stage, rather than doing so during the actual capture stage.

Figure 3:
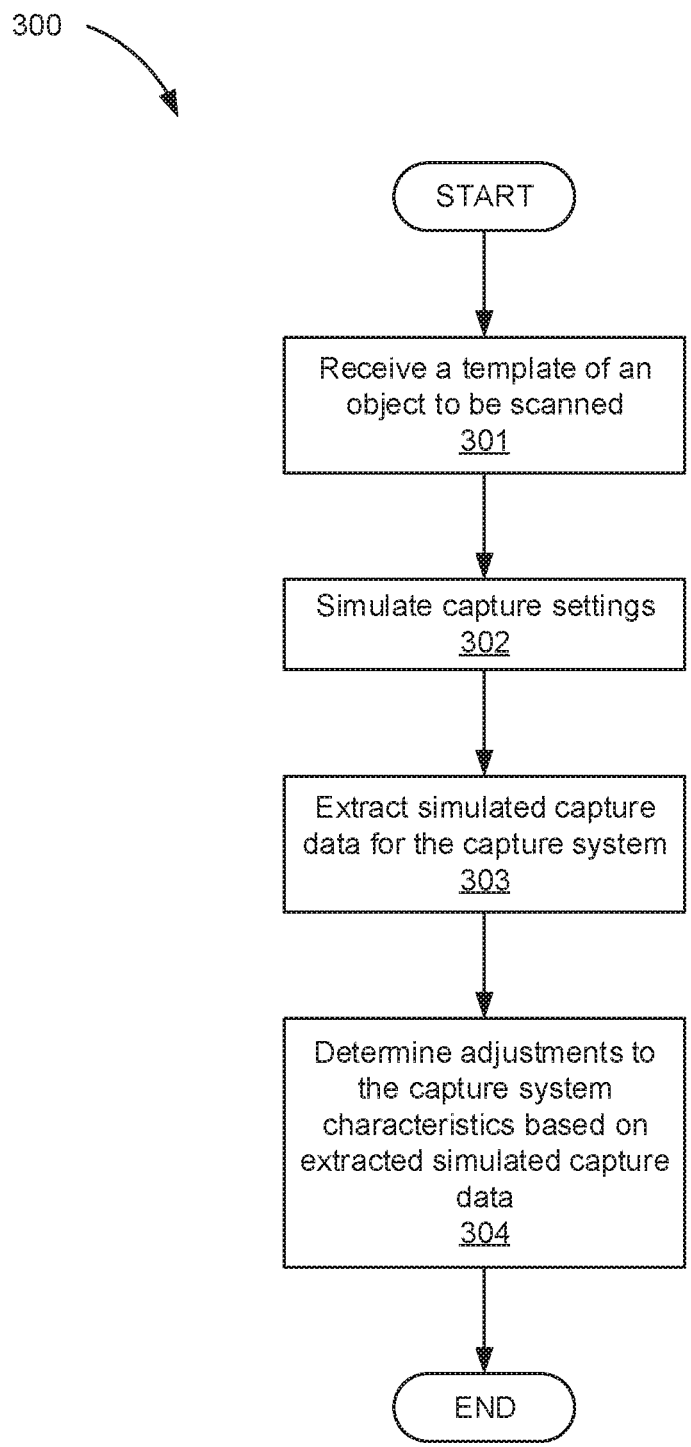
FIG. 3 is a flow chart of a method for carrying out simulation-based capture system adjustments, according to an example of the principles described herein.

FIG. 3 is a flow chart of a method (300) for carrying out simulation-based capture system adjustments, according to an example of the principles described herein. In a first operation, a reference model of an object (FIG. 1, 102) to be scanned is received (block 301). As described above, the reference model may be a point cloud representation of the object (FIG. 1, 102). That is, the reference model may include a variety of points dispersed across its surface, each point with its own unique reference location. This point cloud is used to determine a quality of the capture system's ability to accurately digitize the object (FIG. 1, 102) and used as a basis for capture device (FIG. 1, 104) adjustment to enhance scan quality.

The capture system simulator (FIG. 2, 208) then simulates (block 302) capture settings of the capture system, which capture system includes a number of capture devices (FIG. 1, 104) placed around the object (FIG. 1, 102). As described above, the number of capture devices (FIG. 1, 104) may be one, in which case the capture device (FIG. 1, 104) may rotate about the object (FIG. 1, 102) during scanning. In another example, the number of capture devices (FIG. 1, 104) is greater than one. The greater than one capture device(s) (FIG. 1, 104) are mobile or stationary and their combined simulations used to determine scan quality.

Simulated capture data for the capture system is extracted (block 303) and used to determine (block 304) adjustments to the capture settings. That is, for each capture device (FIG. 1, 104) in the capture system, the portion of the point cloud for the object (FIG. 1, 102) reference model that is visible to that capture device (FIG. 1, 104) is extracted. From this it can be determined what portion of the object (FIG. 1, 102) is visible by the capture system under its current set-up. Adjustments can then be made. Such adjustments may be to the number and position of capture devices. For example, an adjustment may be to add capture devices (FIG. 1, 104) to the capture system, adjust the position of the capture devices (FIG. 1, 104) relative to each other or relative to the object (FIG. 1, 102), and/or adjust the settings of the different capture devices (FIG. 1, 104). It should be noted that any combination of the above adjustments may be made to the capture system. The above described process may be performed iteratively. That is, capture settings may be simulated (block 302), capture data extracted (block 303), and adjustments determined (block 304). After the adjustments are made, the adjusted capture settings are simulated (block 302) and the process repeats until a desired quality of 3D scan is predicted.

Figure 4:
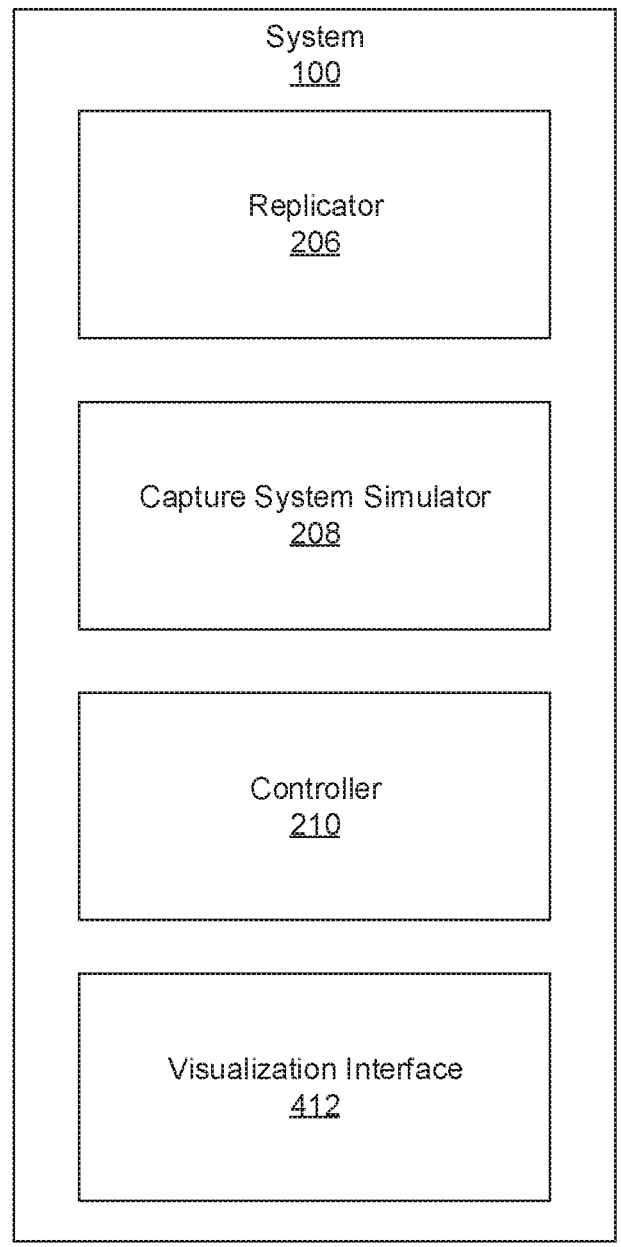
FIG. 4 is a block diagram of a system for simulation-based capture system adjustments, according to another example of the principles described herein.

FIG. 4 is a block diagram of a system (100) for simulation-based capture system adjustments, according to another example of the principles described herein. Similar to the system (100) depicted in FIG. 2, the system depicted in FIG. 4 includes a replicator (206), a capture system simulator (208), and controller (210). In this example, the system (100) further includes a visualization interface (412). The visualization interface (412) generates a visualization of the capture environment, that is the capture system and the reference model. That is, the visualization interface (412) may present on a display device coupled to the system (100) the reference model as well as representations of the capture devices (FIG. 1, 104) used to perform a 3D scan of the object (FIG. 1, 102).

The visualization interface (412) may also visualize the adjustments to the capture system. For example, either during or after the adjustments determined by the system (100) have been made, the visualization interface (412) may be updated to show the adjusted or changed positions and numbers of the capture devices (FIG. 1, 102). The visualization interface (412) also facilitates user adjustment of the capture settings. In some examples, adjustments may be made automatically to the capture devices (FIG. 1, 102). That is, the adjustments may be made without physical user manipulation of the capture devices (FIG. 1, 104).

In other examples, rather than automatically changing the setup, a prompt may be provided to a user to adjust the capture devices (FIG. 1, 102). In some examples, both manual and automatic adjustment may be facilitated. That is, the system (100) may automatically adjust the capture device (FIG. 1, 104) position and may allow for further additional adjustment via direct user input.

The visualization interface (412) may also depict the capture device (FIG. 1, 104) settings. Accordingly, in addition to manipulating capture device (FIG. 1, 104) position and quantity, a user may via a menu, adjust various settings of the capture device(s) (FIG. 1, 104) based on input from the system (100) or based on independently determined criteria.

Figure 5A:
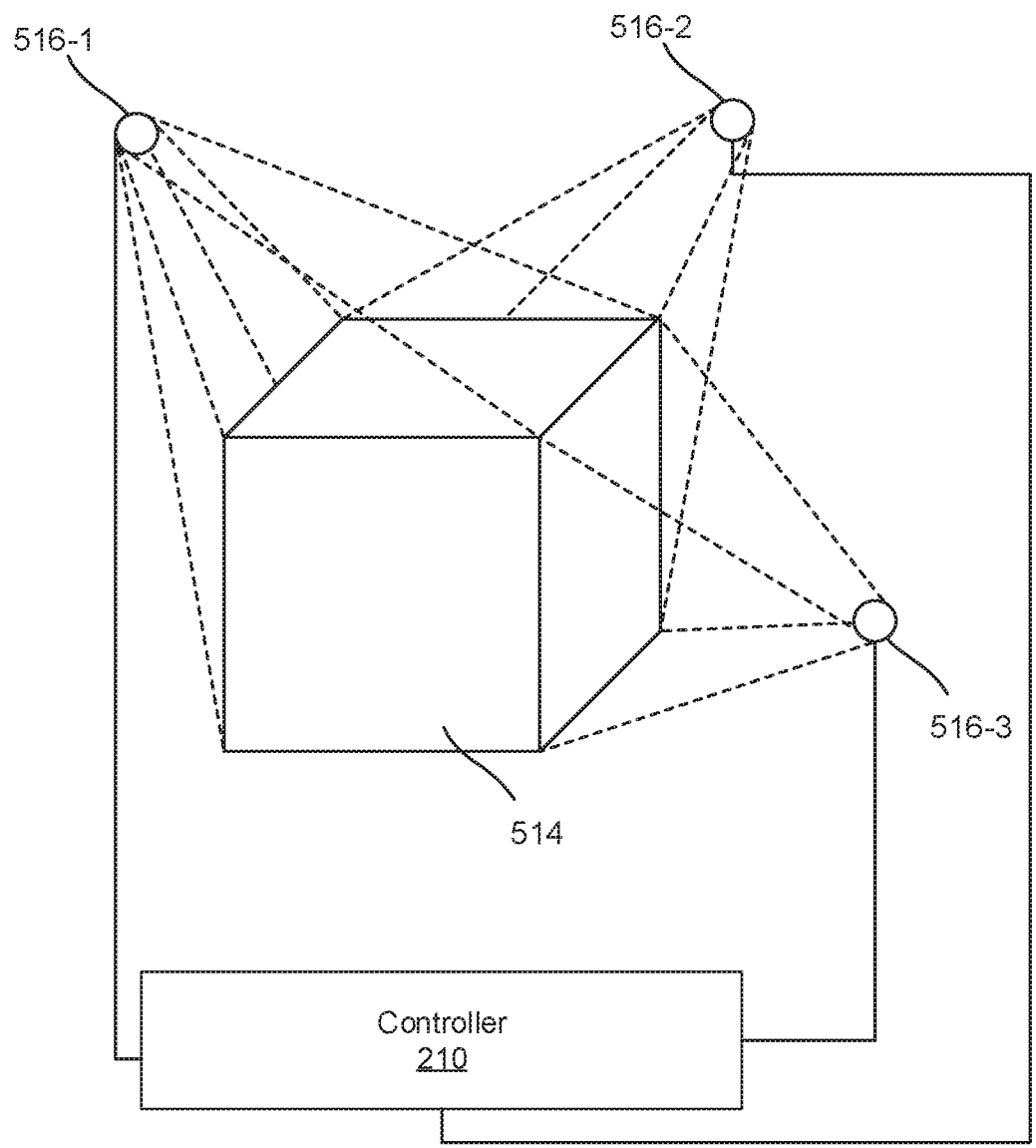
FIGS. 5A and 5B depict a visualization of the system, according to an example of the principles described herein.
Figure 5B:
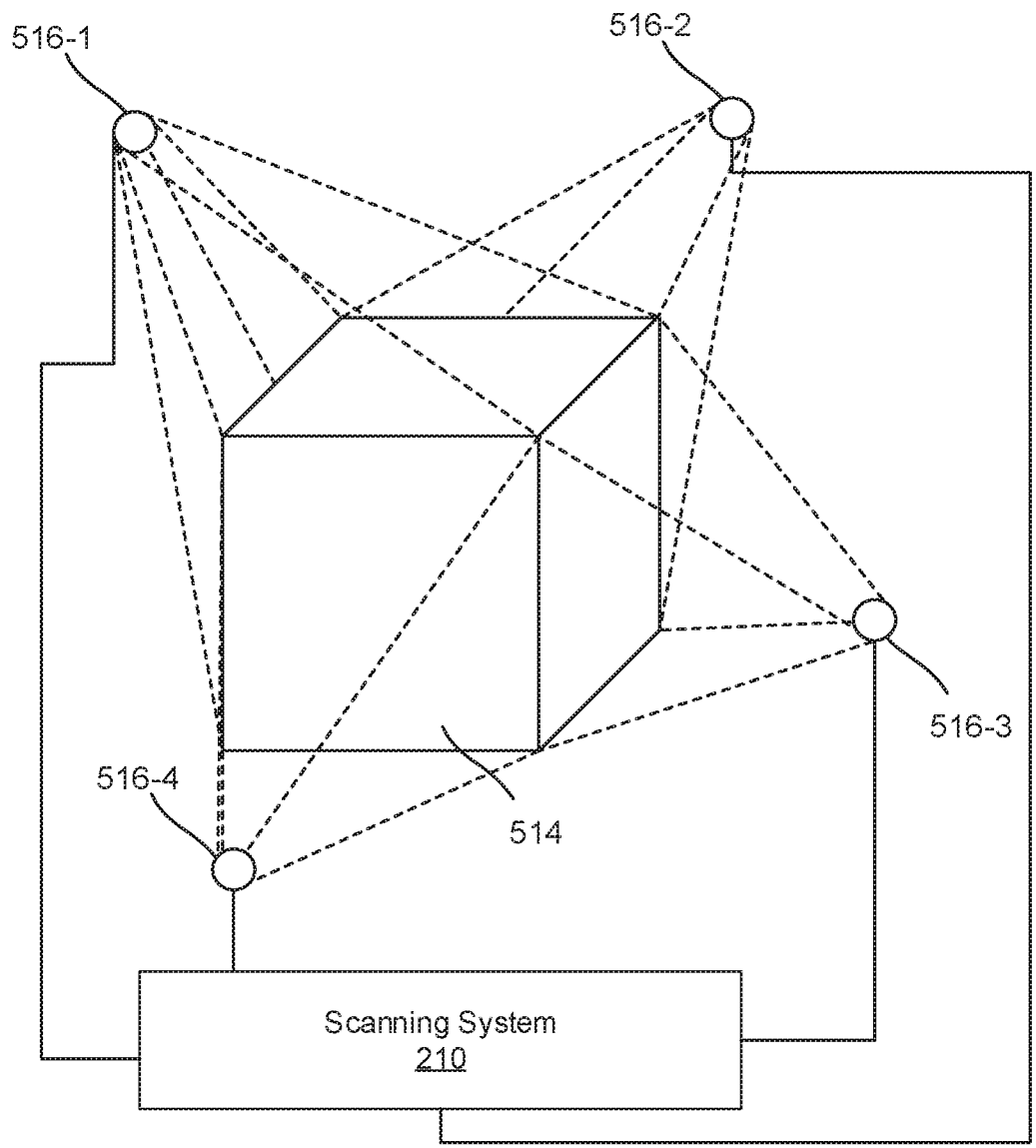

FIGS. 5A and 5B depict a visualization of the capture system, according to an example of the principles described herein. As described above, the capture system may include many capture devices (FIG. 1, 104) and the capture system simulator (FIG. 2, 208) may simulate the capture devices (FIG. 1, 104). FIGS. 5A and 5B depict such a simulation with representations (516-1, 516-2, 516-3) of capture device (FIG. 1, 104) surrounding a reference model (514) which as described above may be a stand-in for the object (FIG. 1, 102).

The field of view of each capture device (FIG. 1, 104) is indicated by dashed lines in the figure. FIGS. 5A and 5B clearly depict the example where the capture system includes multiple capture devices (FIG. 1, 104) represented by the multiple representations (516-1, 516-2, 516-3). In this example, the capture devices (FIG. 1, 104) are stationary. In this example, the capture settings that may be adjusted include the position of each capture device (FIG. 1, 104).

A reference model (514) is passed to the system (100) as well as is information from representations of each of the capture devices (FIG. 1, 102). From this information, the controller (210) can evaluate the scanning environment. Specifically, the controller (210) determines which portions of the reference model (514) are not viewable. For example, the controller (210) may determine that a capture device (FIG. 1, 104) associated with the first representation (516-1) can image the top portion of the reference model (514) and a left side of the reference model (514), while a capture device (FIG. 1, 104) associated with the second representation (516-2) can image the back portion of the reference model (514), and a capture device (FIG. 1, 104) associated with the third representation (516-3) can image the right side portion of the reference model (514). The controller (210) may also determine that a front portion of the reference model (514) is not visible by the capture system with its current operating set-up. This may be determined based on an analysis of the extracted point cloud information for each representation (516). Accordingly, the controller (210) determines that an additional capture device (FIG. 1, 104) should be included in the capture system, which additional capture device (FIG. 1, 104) are represented in the visualization depicted in FIG. 5B.

Accordingly, as suggested in FIG. 5B, an additional capture device (FIG. 1, 104) represented in the visualization as the fourth representation (516-4) may be added to the capture system to capture the front surface of the reference model (514), such that all surfaces of the object (FIG. 1, 102) may be captured during a scan operation.

Figure 6A:
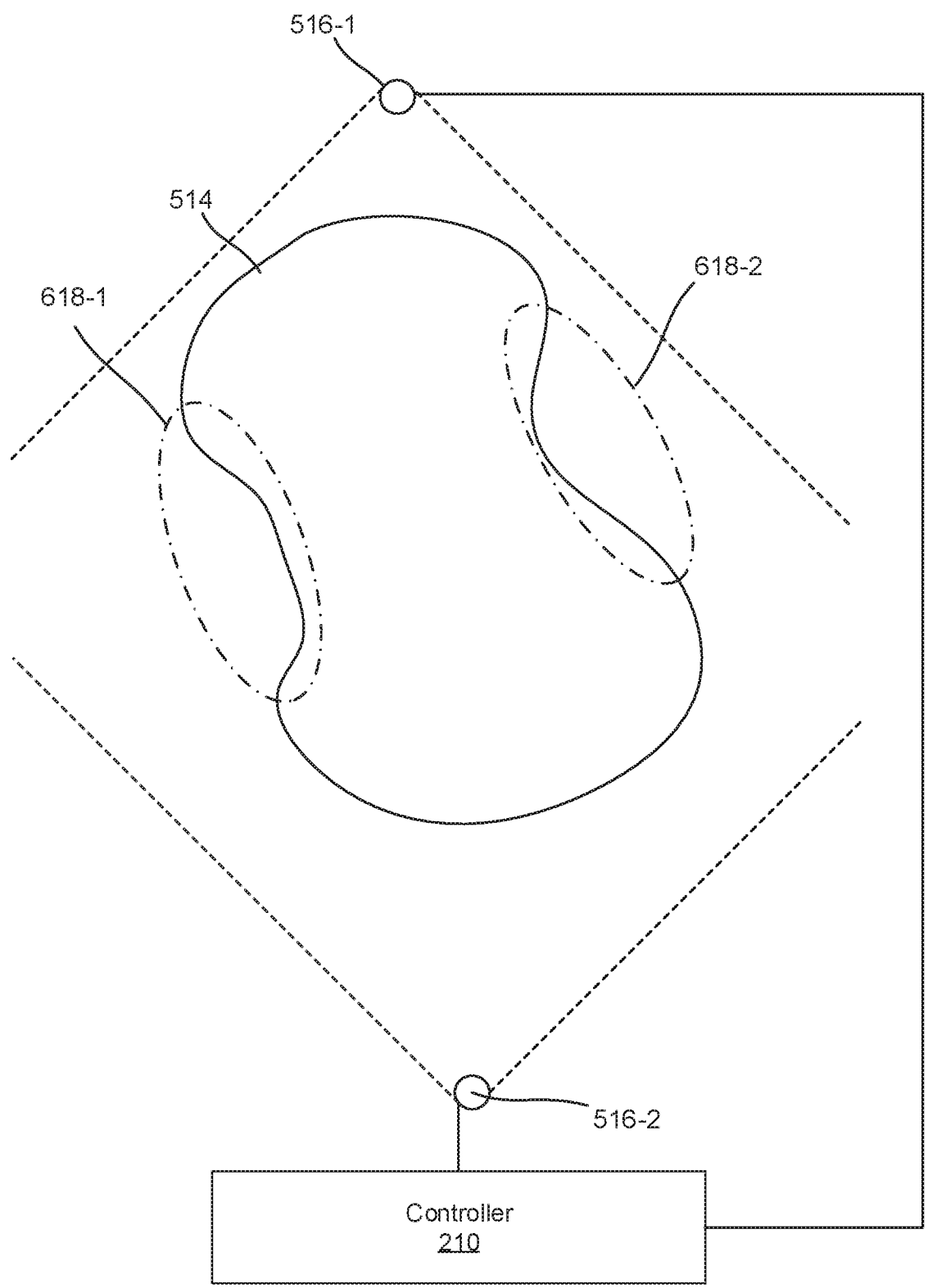
FIGS. 6A and 6B depict a visualization of the system, according to an example of the principles described herein.
Figure 6B:
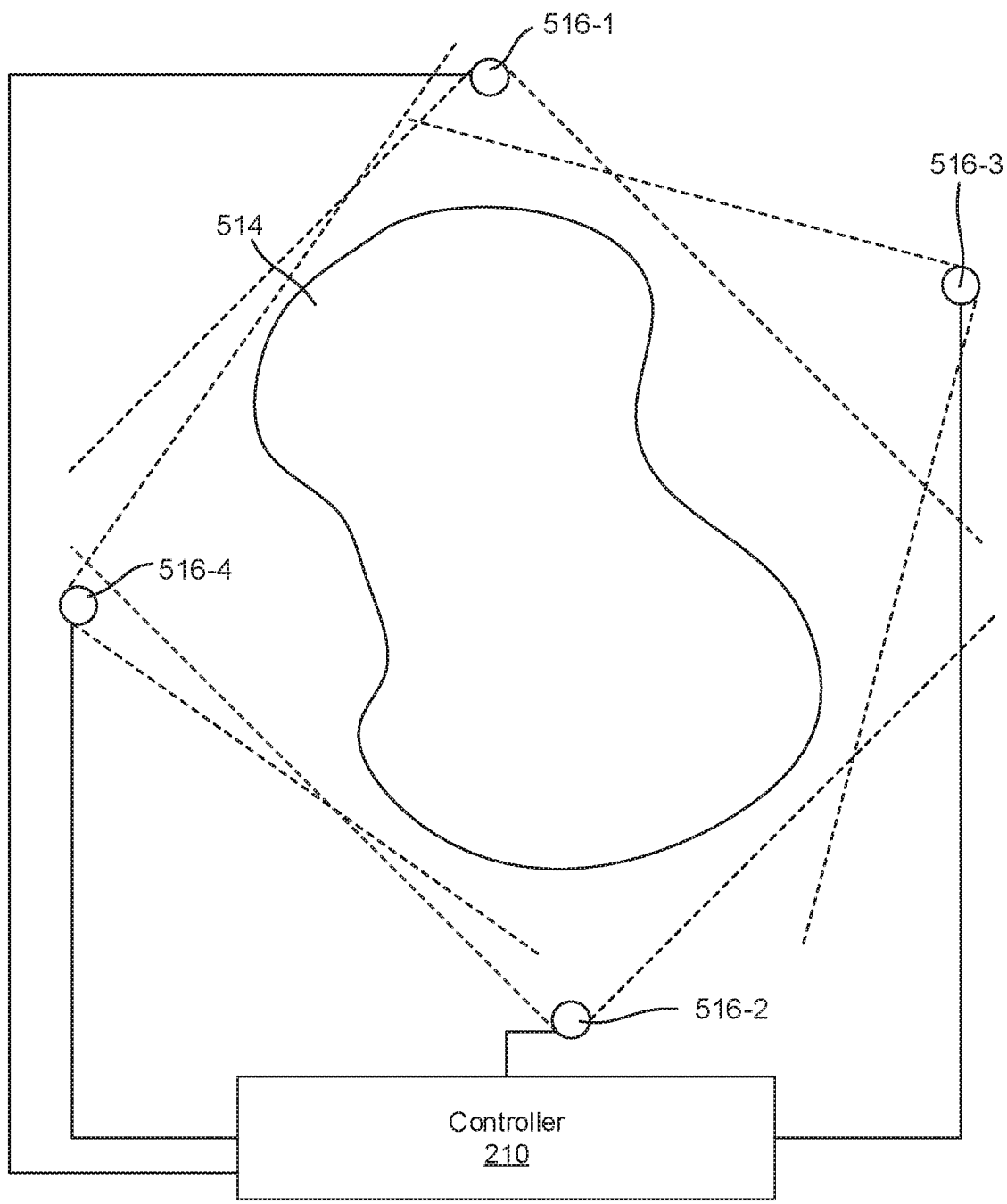

FIGS. 6A and 6B depict a visualization of the capture system, according to another example of the principles described herein. Specifically, FIGS. 6A and 6B depict a top view of a simplified system. In this example, the capture system includes two capture devices (FIG. 1, 104) as indicated by the associated representations (516-1, 516-2). However, due to the limited field of view of each capture device (FIG. 1, 104) and in some examples, the complex nature of an object (FIG. 1, 102) to be scanned, occlusions (618-1, 618-2) may result. In general, an occlusion (618) refers to locations on the surface of an object (FIG. 1, 102) that are not viewable with the current capture system configuration. Such occlusions (618) are visible on the reference model (514) that is a representative form of the object (FIG. 1, 102) to be scanned.

Such occlusions (618) may be detected by comparing the point clouds extracted from each capture device (FIG. 1, 104) against those identified for the reference model (514). That is, the controller (210) may extract from each representation (516), the portions of the point cloud that make up the reference model (514) that are visible to each representation (516). As the surface portions within the occlusions (618) are not viewable by either the first representation (516-1) or the second representation (516-2), no point cloud information will be extracted by the controller (210). Accordingly, a comparison of the point cloud for the reference model (5148) and the extracted point cloud information from the representations (516) will identify these locations as differences. Any difference in the point cloud information for the reference model (514) and the extracted information from the representations (516) indicates an occlusion (618), or a region of the reference model (514) for which no information was collected. The lack of information collected indicates that this portion of the reference model (514), and therefore the corresponding object (FIG. 1, 102), is not viewable by the capture system. Accordingly, the system (FIG. 1, 100) may determine certain adjustments to be made to the capture system as depicted in FIG. 6B.

Specifically, the adjustments made as indicated in FIG. 6B are that two additional capture devices (FIG. 1, 104) have been added to the capture system as indicated by two additional representations (516-3, 516-4). Moreover, the position of a capture device (FIG. 1, 104) associated with the second representation (516-2) was adjusted to be closer to the reference model (514) such that a higher quality reproduction of the object (FIG. 1, 102), perhaps at a higher resolution, may be acquired. Note also that as depicted in FIG. 6B, the occlusions (FIG. 6A, 618) on the surface of the reference model (514) are no longer present. Accordingly, the determination of the adjustments to be made to the capture system may take into account detected occlusions (FIG. 6A, 618). That is, the adjustments may be made such that a threshold number, or percentage, of points of the reference model (514) point cloud are identified by the capture devices (FIG. 1, 104) of the capture system.

Figure 7A:
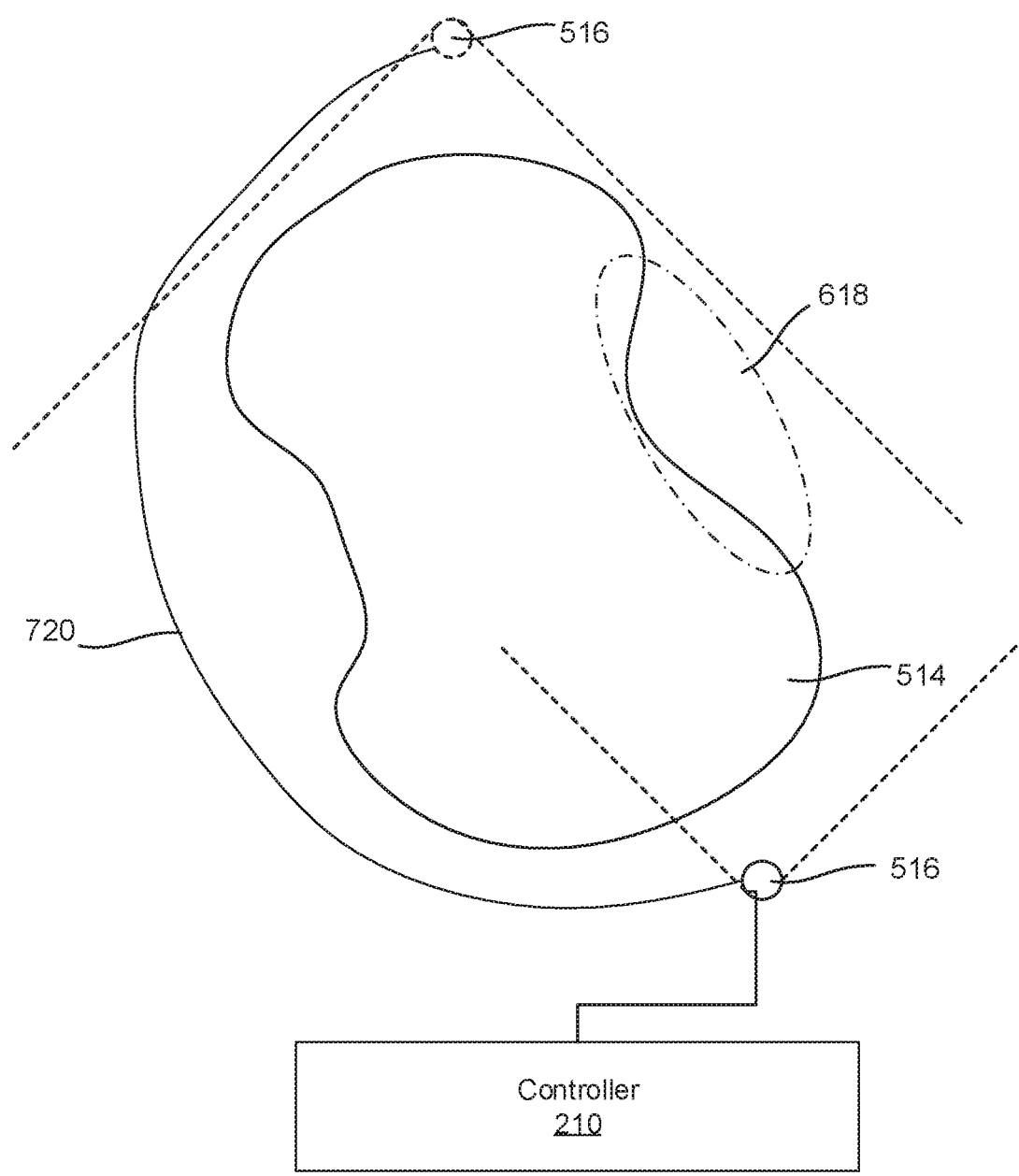
FIGS. 7A and 7B depict a visualization of the system, according to an example of the principles described herein.
Figure 7B:
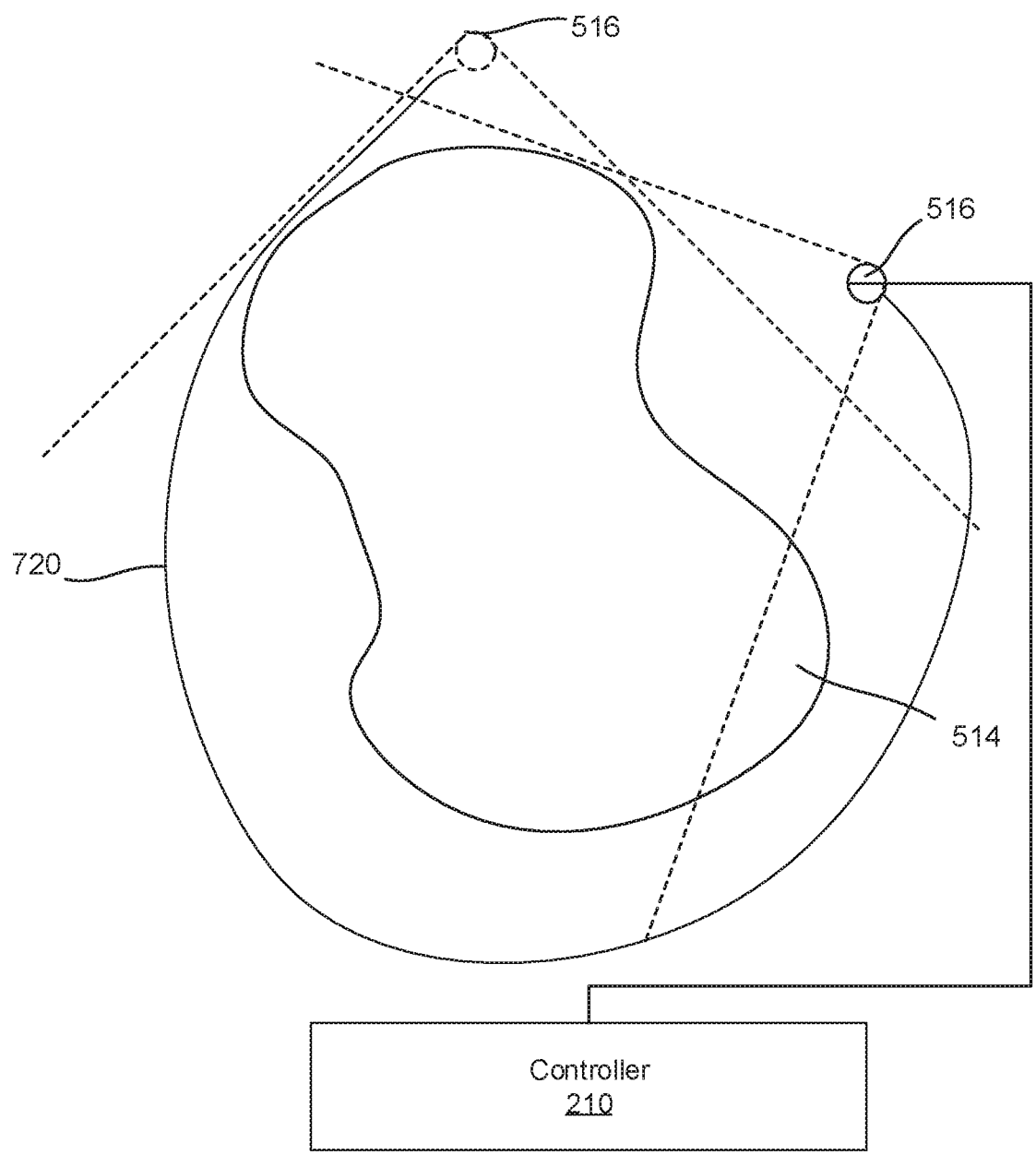

FIGS. 7A and 7B depict a visualization of the capture system, according to another example of the principles described herein. That is, in some examples, such as that example depicted in FIGS. 7A and 7B, the capture system includes a single capture device (FIG. 1, 104) visualized within the visualization as a representation (516) that moves about the object (FIG. 1, 102). The path of the single capture device (FIG. 1, 102) about the reference model (514) is replicated in the capture system simulator (FIG. 2, 208) as going around the reference model (514). In this example, a capture system characteristic that is adjusted includes the trajectory (720) of the single capture device (FIG. 1, 104) about the object (FIG. 1, 102). As depicted in FIG. 7A, the current trajectory of the capture device (FIG. 1, 104) about the object (FIG. 1, 102) results in an occlusion (618) as indicated by the dashed-dot line. Information may be fed to the scanning controller (210) which identifies the lack of information collected for this portion of the reference model (514) and adjusts the trajectory (720) to be as depicted in FIG. 7B such that the entirety of the object (FIG. 1, 102) may be captured as indicated by the lack of occlusions (FIG. 7A, 618) in FIG. 7B.

Figure 8:
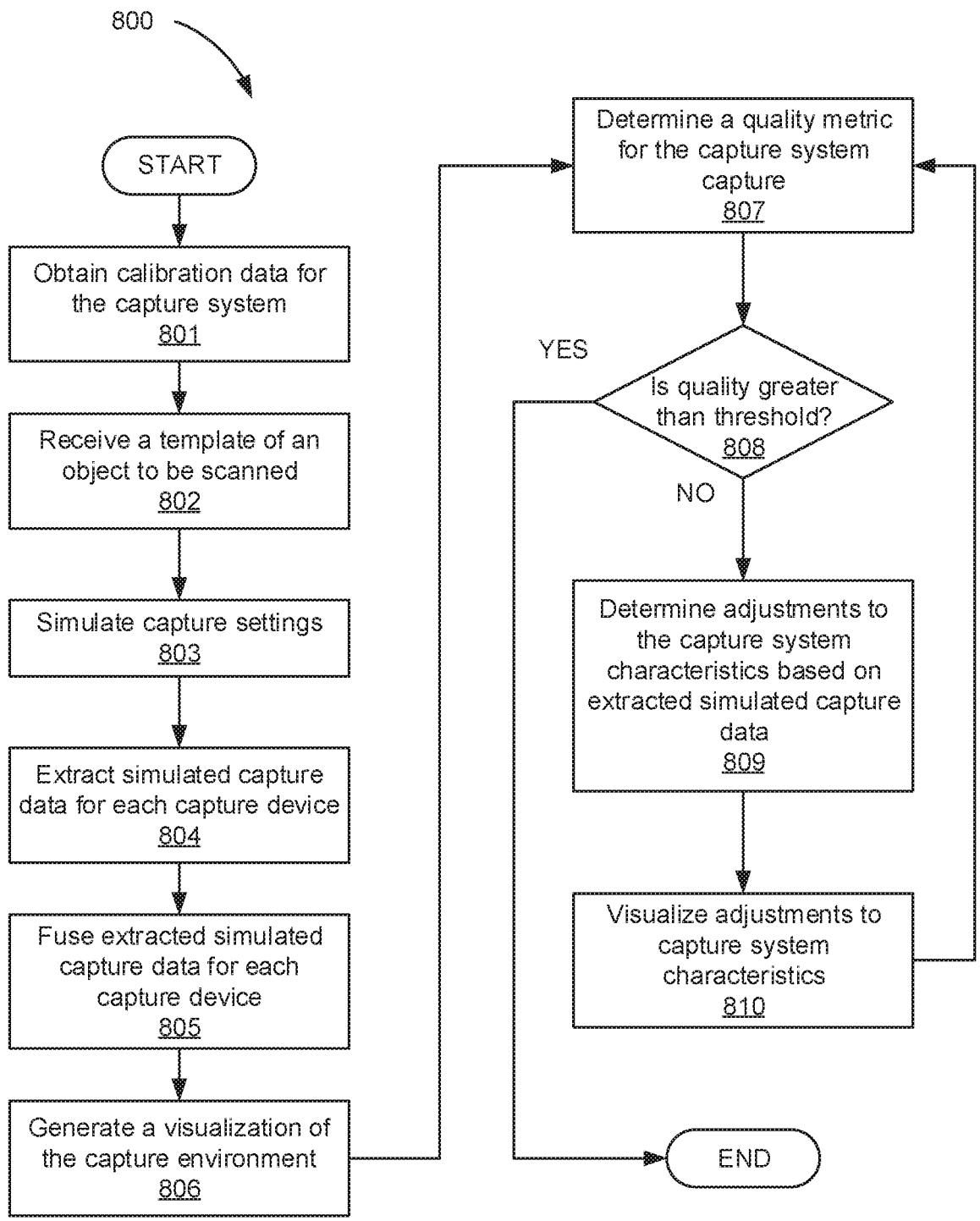
FIG. 8 is a flow chart of a method for carrying out simulation-based capture system adjustments, according to another example of the principles described herein.

FIG. 8 is a flow chart of a method (800) for carrying out simulation-based capture system adjustments, according to another example of the principles described herein. According to this method (800), calibration data for the capture system is obtained (block 801). The calibration data may include the initial number of capture devices (FIG. 1, 104) that make up the capture system as well as the initial location of each capture device (FIG. 1, 104). This information is used as a starting point from which adjustments may be made.

A reference model (FIG. 5A, 514) of an object (FIG. 1, 102) to be scanned is received (block 802), capture settings are simulated (block 803), and simulated capture data for each capture device (FIG. 1, 102) is extracted (block 804). These operations may be performed as described above in connection with FIG. 3.

In some examples, the method (800) further includes fusing (block 805) extracted simulated capture data for each capture device (FIG. 1, 102) in the capture system. That is, the point clouds visible to each capture device (FIG. 1, 102) are stitched together such that an indication of the entirety of the point cloud that can be seen by the collective capture devices (FIG. 1, 102) of the capture system can be obtained. Note that in some examples, such a fusing (block 805) is not performed as processors associated with the capture devices (FIG. 1, 104) or the controller (FIG. 2, 210) can operate based on unfused data.

In general, a point cloud can be generated for each capture device (FIG. 1, 102). Fusing views from multiple capture devices (FIG. 1, 102) involves collecting information about the position of each capture device (FIG. 1, 102), so that all point clouds extracted by the various capture devices (FIG. 1, 102) can be aligned to a common reference frame. This location information can be obtained through geometric calibration of the capture devices (FIG. 1, 102) or by another method. For example, the multiple point clouds can be aligned using an iterative closest point calculation, which automatically computes the relative capture device (FIG. 1, 102) positions based on a predetermined alignment metric. A fused point cloud obtained in whatever form, allows for the removal of erroneous measurements and to potentially remove irrelevant data points such as background points.

In this example, the controller (FIG. 2, 210) may fuse the different extracted data, thus obtaining a representation of the surface of the object (FIG. 1, 102) as viewed by the capture devices of the capture system. The resulting 3D model can be represented as 3D point cloud or 3D mesh.

The system (FIG. 1, 100) then generates (block 806) a visualization of the capture environment. That is, the visualization may display the reference model (FIG. 5, 514) as well as representations (FIG. 5A, 516) of the capture devices (FIG. 1, 102) of the capture system. Doing so provides a visual indication and aid to the user in evaluating the capture system.

A quality metric for the capture system capture can then be determined (block 807). That is, the ability of the capture system to accurately represent the object is determined. Doing so may include identifying holes, or occlusions in the data. Occlusions are indicative of total surface area coverage. Accordingly, a quantity of occlusions, or point clouds on the reference model that are not extracted from capture devices (FIG. 1, 104), are indicative of the surface area covered by the capture system and is one measure of capture quality.

For example, if certain parts of the reference model (FIG. 5A, 514) are out of view of all of the capture devices (FIG. 1, 102) in the system, then this may impact the quality of the resulting 3D scan. Other factors may be indicative of quality such as noise found within the extracted data and/or a resolution of the scan.

As a particular example, the quality of the capture system capture may refer to a quantity of points identified. For example, in a particular application it may be determined that a point cloud of approximately 15,000 points sufficiently defines a particular object to be scanned. Accordingly, the quality metric for the capture system may be a difference between a predefined threshold number and the number of points actually extracted.

In another example, the quality metric may be based on a distance between points. For example, if an average distance between points is too large, it may indicate that 1) a higher resolution should be sought, i.e., capture device (FIG. 1, 102) settings should be changed or that areas of the object (FIG. 1, 102) have not been simulated and therefore are outside of the view of a capture devices (FIG. 1, 102). While specific reference is made to a few quality metrics, a wide variety of quality metrics may be implemented.

In some examples, determining (block 807) a quality metric for the capture system includes comparing extracted simulated capture data against the reference model (FIG. 5, 514). For example, it may be known that a reference model (FIG. 5, 514) for an object (FIG. 1, 102) to be scanned includes a certain amount of points, or points at a certain resolution. Accordingly, the extracted data, whether fused or considered individually, may be compared against the reference model (FIG. 5, 514) point cloud. In this example, the quality metric may be based on how different the extracted point cloud and the reference model (FIG. 5, 514) point cloud are from one another. For example, the quality metric may be a numeric value that is indicative of this difference. For example, the quality metric may be 98%, meaning that 98% of the reference model (FIG. 5, 514) point cloud is represented by the extracted information from the simulated (FIG. 5A, 516) capture devices.

This quality metric may be compared (block 808) against a quality threshold. That is, it may be determined whether the quality metric of the capture system capture is greater than a quality threshold. The quality threshold may be any value range, based on the quality metric used, that indicates an acceptable performance of the capture system.

If the determined quality metric is greater than the quality threshold (block 808, determination YES), the method (800) terminates and another operation may be carried out. For example, a scanning of the object (FIG. 1, 102) may be automatically triggered, or a prompt may be provided to a user that a satisfactory level of scan is anticipated and may then seek approval from the user to initiate a scan.

If the quality metric for the capture system capture is not greater than the quality threshold (block 808, determination NO), then adjustments to be made to the capture system are determined (block 809). This may be performed as described above in connection with FIG. 3. In cases where the system includes the visualization interface (FIG. 4, 412), the determined adjustments may be visualized (block 810), for example, as a prompt to the user to make such adjustments. In this example, a user may authorize a system to make the adjustments or may manually make adjustments by manually changing capture device settings and/or changing the number and/or position of the capture devices that make up the capture system.

Once the adjustments have been visualized (block 810), the method (800) may return to determining (block 807) a quality metric for the adjusted capture system. If it is then determined (block 808, determination YES) that the quality metric for the adjusted capture system is greater than the quality threshold, the method (800) ends and subsequent operations are carried out. If it is determined (block 808, determination NO) that the quality metric for the adjusted capture system is not greater than the threshold, further adjustments may be determined (block 809) and visualized (block 810). Thus, an iterative method (800) is presented wherein quality is determined, adjustments made, and quality re-evaluated until a desired level of quality is achieved. As noted above, all this may be performed before the capture system engages in the computationally expensive and time-consuming operation of scanning. Thus, an optimal setup for the capture system is determined prior to any such 3D scan operation, thus enhancing the efficiency of this operation.

Figure 9:
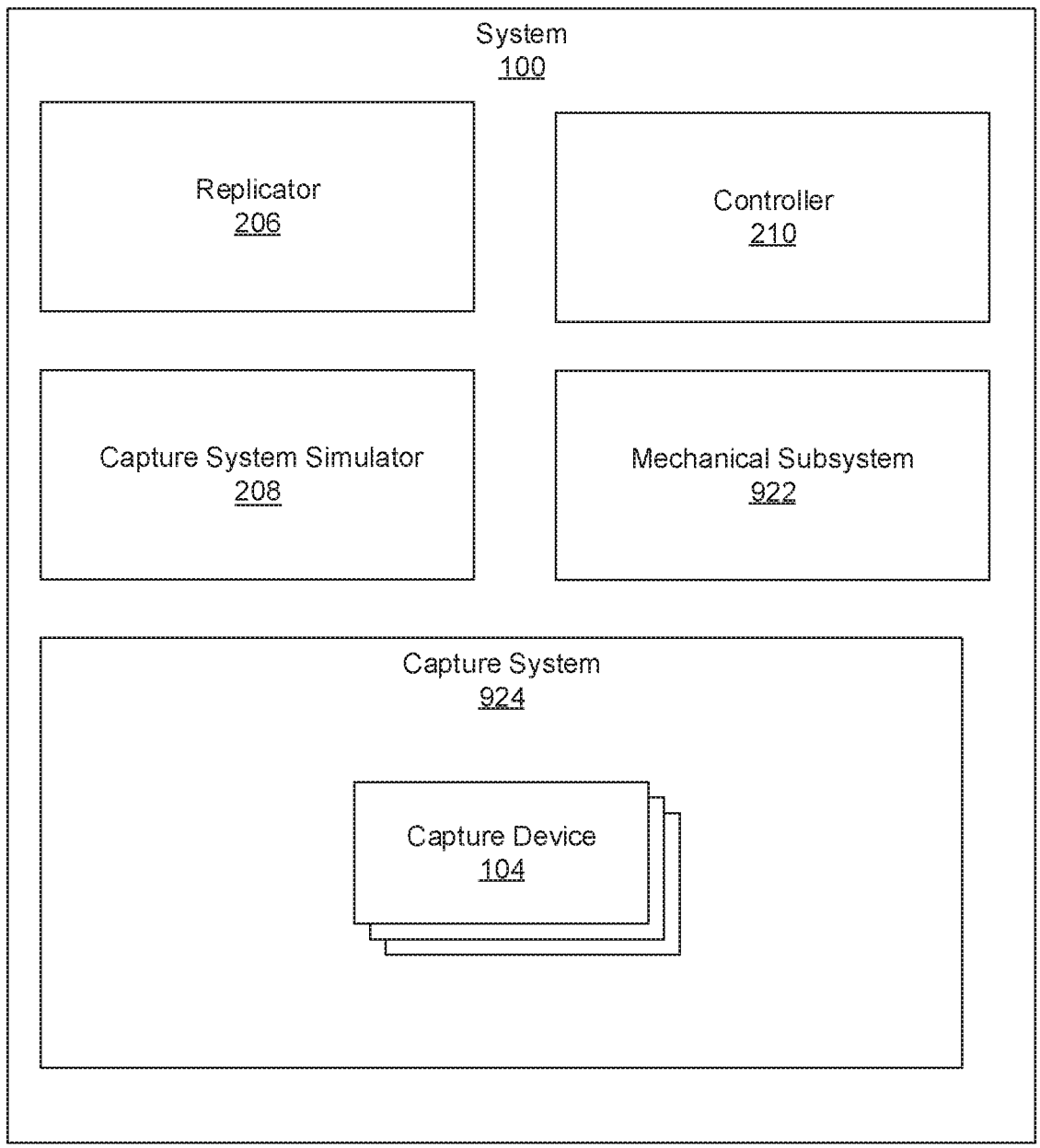
FIG. 9 is a block diagram of a system for simulation-based capture system adjustments, according to another example of the principles described herein.

FIG. 9 is a block diagram of a system (100) for simulation-based capture system (924) adjustments, according to another example of the principles described herein. Similar to the system (100) depicted in FIG. 2, the system (100) includes a replicator (206), a capture system simulator (208), and controller (210). In this example, the system (100) further includes the capture system (924) with its associated capture devices (104) and a mechanical subsystem (922) that physically moves the capture devices (104). That is, each capture device (104) may be placed on a gantry, dolly, or other mechanism that is powered and can move the capture device (104). Such a mechanical subsystem (922) may include any number of components such as motors, rails, belts, pulleys, etc. to move the respective capture device (104). In this example, in addition to determining the adjustments to be made, the system (100) may actually make the adjustments to the capture devices (104). That is, the controller (210) based on extracted information, may activate the mechanical subsystem (922) to physically move the capture devices (104) relative to the object (FIG. 1, 102) and/or relative to other capture devices (104). Put yet another way, the controller (210) may make adjustments in a simulation or in the physical world via the mechanical subsystem (922).

Note that the examples depicted in FIGS. 4 and 9 may be combined. For example, the system (100) may include the visualization interface (FIG. 4, 412) and the mechanical subsystem (922). In this example, the adjustments may be visualized via the visualization interface (FIG. 4, 412) and may be carried out by the mechanical subsystem (922) either via manual user action or automatically by the system (100).

In some examples, the visualization interface (FIG. 4, 412) may display a proposed set-up and then following user authorization, the controller (210) and not the user, may physically adjust the position of the capture devices (104). In other examples, the user may manipulate the representations (FIG. 5A, 516) of the capture devices (104) as displayed on the visualization interface (FIG. 4, 412) and as a result of such user manipulation, the controller (210) may activate the mechanical subsystem (922) to move the capture devices (104).

Figure 10:
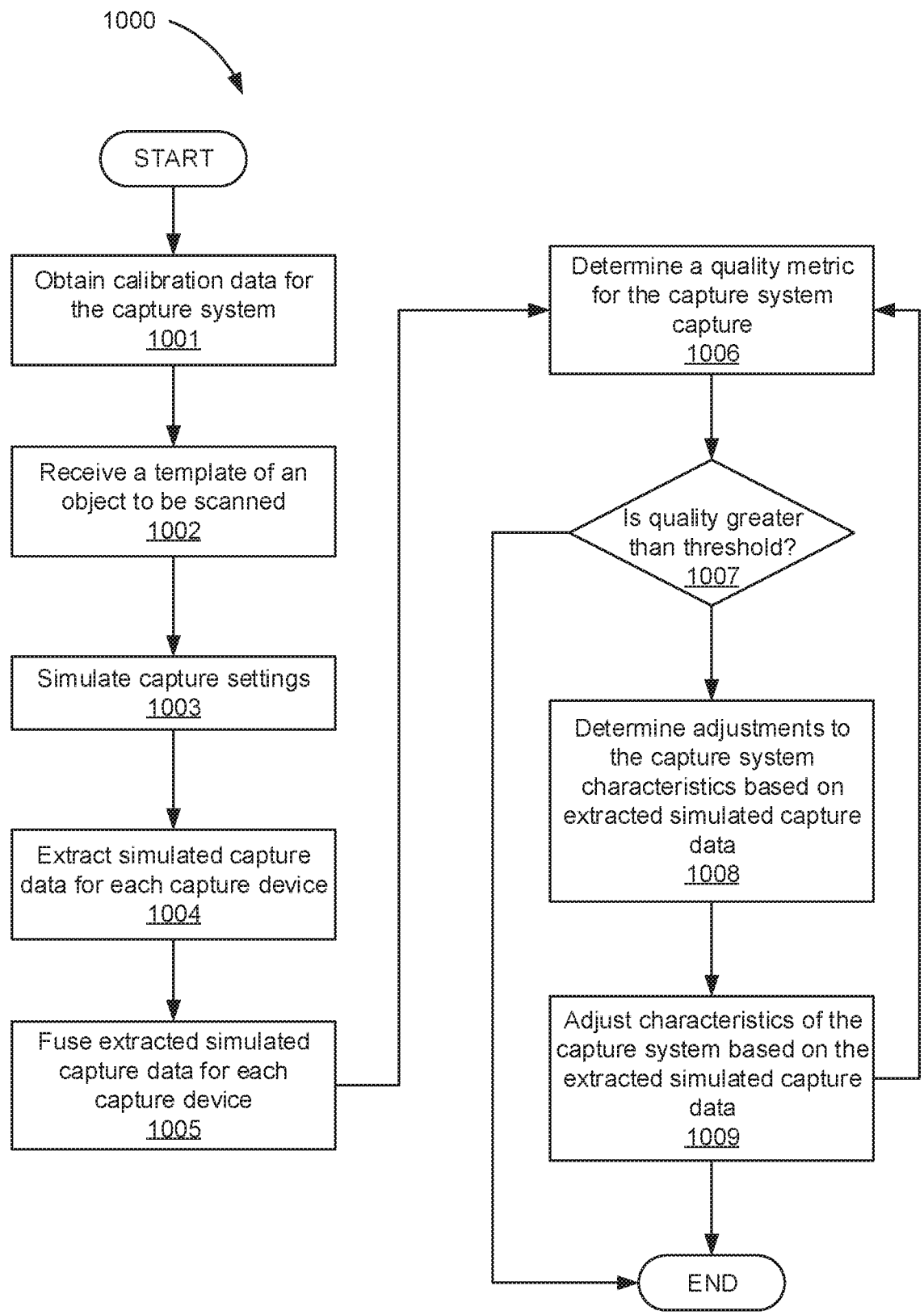
FIG. 10 is a flow chart of a method for carrying out simulation-based capture system adjustments, according to another example of the principles described herein.

FIG. 10 is a flow chart of a method (1000) for carrying out simulation-based capture system (FIG. 9, 924) adjustments, according to another example of the principles described herein. In this example, calibration data for the capture system (FIG. 9, 924) is obtained (block 1001), a reference model (FIG. 5A, 514) of an object (FIG. 1, 102) to be scanned is received (block 1002) and capture settings are simulated (block 1003). The simulated capture data for each capture device (FIG. 1, 104) is extracted (block 1004) and in some examples fused (block 1005) for each capture device (FIG. 1, 104).

A quality metric for the capture system (FIG. 9, 924) capture is determined (block 1006) and compared (block 1007) against a quality threshold. Note that in this example, no visualization of the capture environment is generated. That is, in this example, the system (FIG. 1, 100) may automatedly adjust the capture system (FIG. 9, 924) without user input. Thus, a simplified and automatic way of optimizing a capture system (FIG. 9, 924) is provided.

Adjustments are determined (block 1008) and in this example the capture system (FIG. 9, 924) is actually adjusted (block 1009). That is, the mechanical subsystem (FIG. 9, 922) is activated to move the capture devices (FIG. 1, 104) of the capture system (FIG. 9, 924). In some examples this may be without additional user input or in other examples may be following user authorization.

Figure 11:
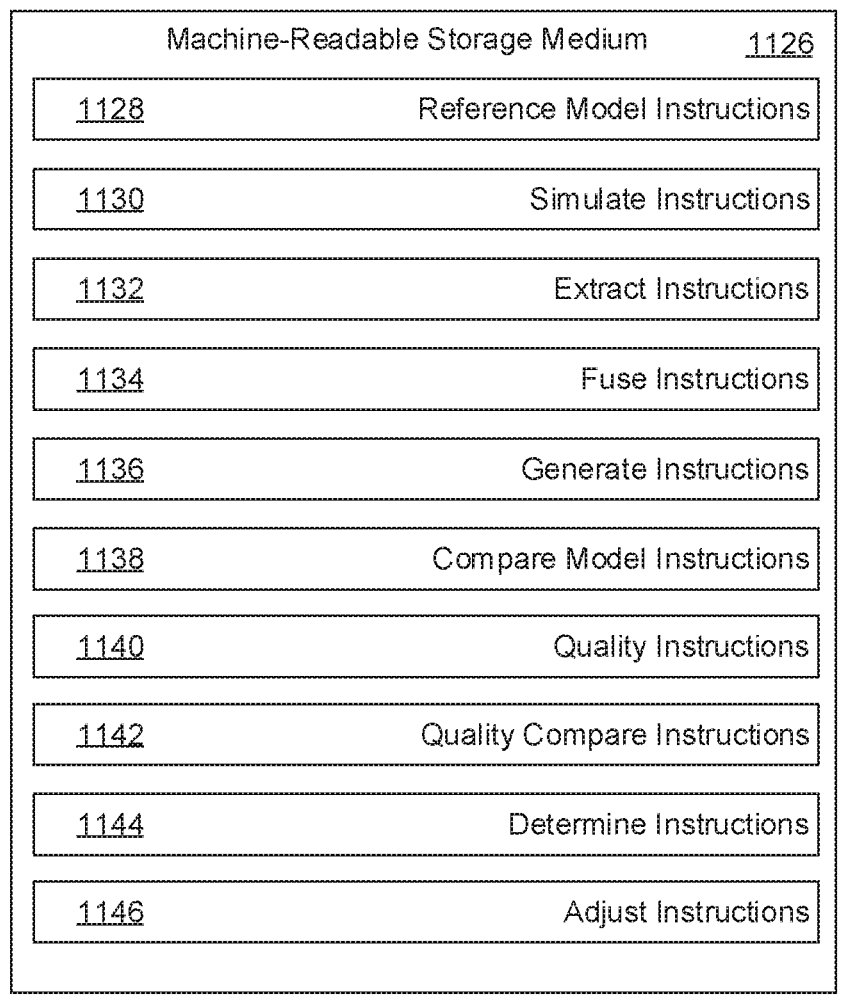
FIG. 11 depicts a non-transitory machine-readable storage medium for simulation-based capture system adjustment, according to an example of the principles described herein.

FIG. 11 depicts a non-transitory machine-readable storage medium (1126) for simulation-based capture system (FIG. 9, 924) adjustment, according to an example of the principles described herein. To achieve its desired functionality, a computing system includes various hardware components. Specifically, a computing system includes a processor and a machine-readable storage medium (1126). The machine-readable storage medium (1126) is communicatively coupled to the processor. The machine-readable storage medium (1126) includes a number of instructions (1128, 1130, 1132, 1134, 1136, 1138, 1140, 1142, 1144, 1146) for performing a designated function. The machine-readable storage medium (1126) causes the processor to execute the designated function of the instructions (1128, 1130, 1132, 1134, 1136, 1138, 1140, 1142, 1144, 1146).

Referring to FIG. 11, reference model instructions (1128), when executed by the processor, cause the processor to receive a reference model (FIG. 5A, 516) of an object (FIG. 1, 102) to be scanned. Simulate instructions (1130), when executed by the processor, may cause the processor to, simulate capture settings of a capture system (FIG. 9, 924) which includes a number of capture devices (FIG. 1, 104) placed around the object (FIG. 1, 102). Extract instructions (1132), when executed by the processor, may cause the processor to extract simulated capture data for the capture system (FIG. 9, 924). Fuse instructions (1134), when executed by the processor, may cause the processor to fuse extracted simulated capture data for each capture device (FIG. 1, 104) in the capture system (FIG. 9, 924). Generate instructions (1136), when executed by the processor, may cause the processor to generate a visualization of the capture system (FIG. 9, 924) and the reference model (FIG. 5A, 514). Compare model instructions (1138), when executed by the processor, may cause the processor to compare fused data against the reference model (FIG. 5A, 514). Quality instructions (1140), when executed by the processor, may cause the processor to determine a quality metric for the capture system capture. Quality compare instructions (1142), when executed by the processor, may cause the processor to compare the quality metric against a quality threshold. Determine instructions (1144), when executed by the processor, may cause the processor to determine adjustments to the capture system (FIG. 9, 924) characteristics based on an output of a comparison of the quality metric against the quality threshold. Adjust instructions (1146), when executed by the processor, may cause the processor to adjust capture settings.

In summary, using such a system 1) automates the capture system adjustment operation, 2) allows for capture system adjustment prior to a full 3D scan, 3) conserves processing bandwidth, 4) enhances three-dimension scanning process flow, 5) improves scan quality, 6) speeds up new product design configuration and 7) allows for adjustment to compensate for different types and dimensions of objects to be scanned. However, the devices disclosed herein may address other matters and deficiencies in a number of technical areas.

What is claimed is:

1. A system comprising:
a processor; and
a memory storing instructions executable by the processor to:
receive a reference model of an object to be scanned;
simulate capture settings of a capture system comprising a number of capture devices placed around the object;
extract simulated capture data for each capture device in the capture system;
fuse the extracted simulated capture data for each capture device to generate fused data for the capture system;
compare the fused data against the reference model to generate first comparison results;
determine a quality metric for the capture system based on the first comparison results;
compare the quality metric against a quality threshold to generate second comparison results;
determine adjustments to the capture settings based on the second comparison results;
adjust the capture settings according to the determined adjustments; and
capture actual capture data of the object with the capture system using the adjusted capture settings.

2. The system of claim 1, further comprising the capture system.

3. The system of claim 1, wherein the instructions are executable by the processor to further:
provide a visualization interface;
generate a visualization of the capture system and the reference model via the visualization interface;
visualize adjustments to the capture settings via the visualization interface; and
facilitate user adjustment to the capture settings via the visualization interface.

4. The system of claim 1, further comprising a mechanical subsystem to physically adjust a position of the number of capture devices.

5. The system of claim 1, wherein:
the capture system comprises a single capture device to move about the object; and
the capture settings comprise a trajectory of the single capture device about the object.

6. The system of claim 1, wherein:
the capture system comprises multiple capture devices; and
the capture settings comprise the position of each capture device.

7. The system of claim 1, wherein the reference model is a digital three-dimensional model of the object to be scanned, and the reference model is received by electronically receiving the digital three-dimensional model.

8. The system of claim 1, wherein the simulated capture data is extracted such that the simulated capture data simulates the actual capture data based on current capture settings.

9. The system of claim 8, wherein the adjustments to the capture settings of the capture system are determined based on identified deficiencies in the simulated capture data.

10. A method comprising:
receiving, by a processor, a reference model of an object to be scanned;
simulating, by the processor, capture settings of a capture system comprising a number of capture devices placed around the object;
extracting, by the processor, simulated capture data for each camera device of the capture system;
fusing, by the processor, the extracted simulated capture data for each capture device to generate fused data for the capture system;
comparing, by the processor, the fused data against the reference model to generate first comparison results;
determining, by the processor, a quality metric for the capture system based on the first comparison results;
comparing, by the processor, the quality metric against a quality threshold to generate second comparison results;
determining, by the processor, adjustments to the capture settings based on the second comparison results;
adjusting, by the processor, the capture settings according to the determined adjustments; and
capturing, by the processor, actual capture data of the object with the capture system using the adjusted capture settings.

11. The method of claim 10, further comprising:
iteratively extracting the simulated capture data and adjusting the capture settings based on a comparison of the extracted simulated capture data and a quality threshold prior to capturing the actual capture data of the object with the capture system using the adjusted capture settings.

12. The method of claim 10, wherein the capture settings are adjusted without user manipulation.

13. The method of claim 12, wherein adjusting the capture settings comprises one or multiple of:
adjusting the number of capture devices in the capture system;
adjusting a position of one or more of the number of capture devices in the capture system; and
adjusting capture device characteristics of one or more of the number of capture devices.

14. The method of claim 10, wherein the reference model is a virtual approximation of the object to be scanned.

15. The method of claim 10, wherein the adjustments to the capture settings are determined to increase a surface area of the object that is within a field of view of the number of capture devices collectively.

16. A non-transitory machine-readable storage medium encoded with instructions executable by a processor to:
receive a reference model of an object to be scanned;
simulate capture settings of a capture system comprising a number of capture devices placed around the object;

extract simulated capture data for each capture device in the capture system;

fuse the extracted simulated capture data for each capture device to generate fused data for the capture system;

compare the fused data against the reference model to generate first comparison results;

based on the first comparison results, determine a quality metric for the capture system;

compare the quality metric against a quality threshold to generate second comparison results;

determine adjustments to the capture settings based on the second comparison results;

adjust the capture settings according to the determined adjustments; and capture actual capture data of the object with the capture system using the adjusted capture settings.

17. The non-transitory machine-readable storage medium of claim 16, wherein the quality metric of the capture system is based on occlusions in the capture system.

* * * * *